May 13, 1952 R. M. ULRICH 2,596,948
WAGON HOIST
Filed Nov. 8, 1946 2 SHEETS—SHEET 1

Inventor:
Raymond M. Ulrich
By: Alois W. Graf
Atty.

May 13, 1952     R. M. ULRICH     2,596,948
WAGON HOIST
Filed Nov. 8, 1946     2 SHEETS—SHEET 2
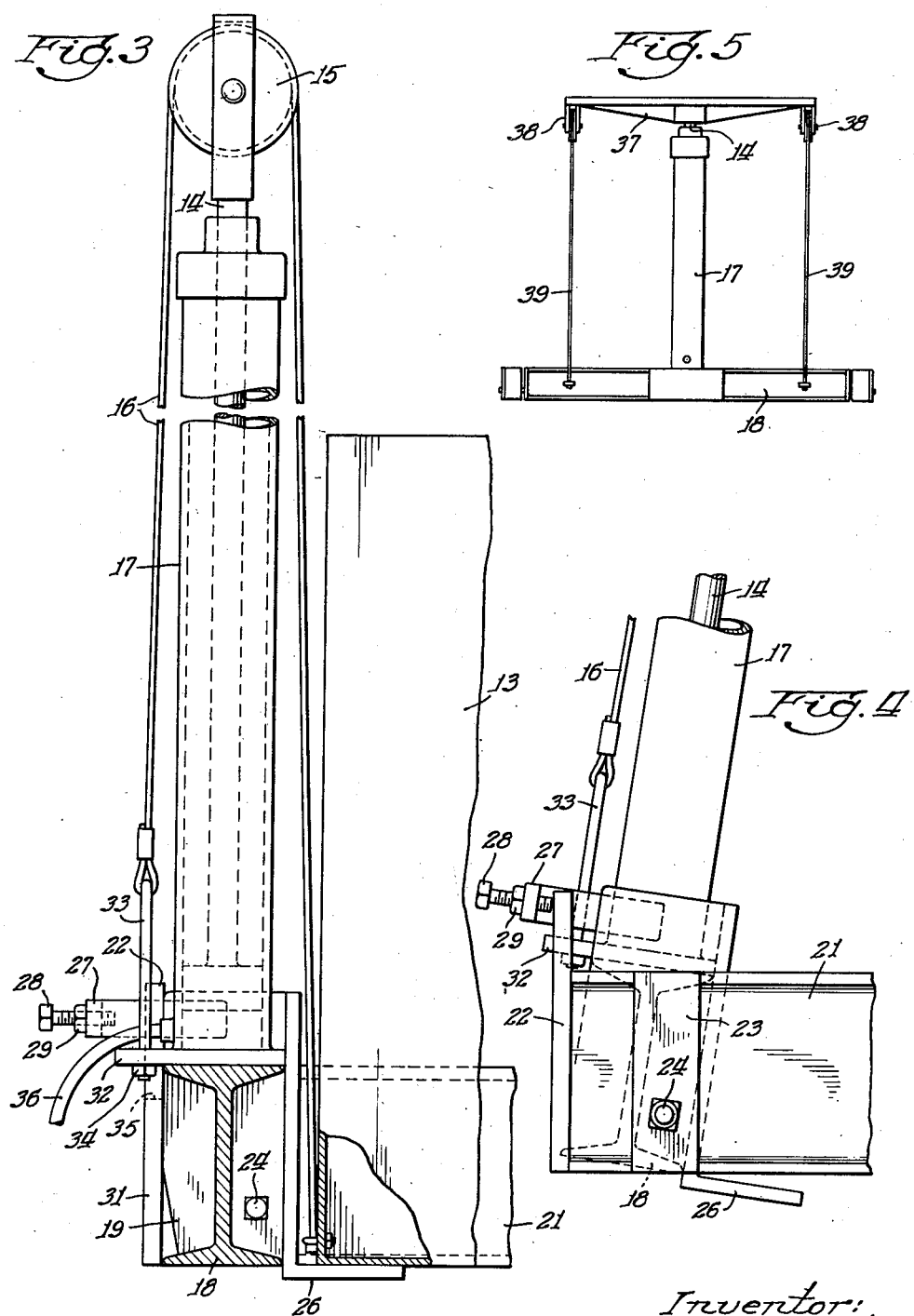
Inventor:
Raymond M. Ulrich
By: Alois W. Graf   Atty.

Patented May 13, 1952

2,596,948

UNITED STATES PATENT OFFICE 2,596,948

WAGON HOIST

Raymond M. Ulrich, Roanoke, Ill., assignor to Ulrich Foundation, Inc., a corporation of Delaware Application November 8, 1946, Serial No. 708,773

7 Claims. (Cl. 298—19)

The present invention relates to a vehicle hoist of the type used for wagons or trucks.

In the instance of agricultural vehicles or wagons it has been found desirable to dump the body. To accomplish this it further is desirable to do so with a minimum cost and equipment. In accordance with the present invention a hoist for the vehicle body is provided which is relatively simple and yet sturdy and reliable.

It therefore is an object of this invention to provide a simple hoist construction for vehicle bodies.

Still another object of the present invention is to provide a simple wagon body hoist which employs a single hydraulic cylinder and piston.

Other and further objects of the present invention will become apparent from the following description taken in conjunction with the accompanying drawings wherein:

Figure 3 is a side view of the invention with the body in lowered position;

Figure 4 is a partial side view of the invention when the body is in raised position; and Figure 5 is a front view of a modified form of the present invention.

Figure 1:
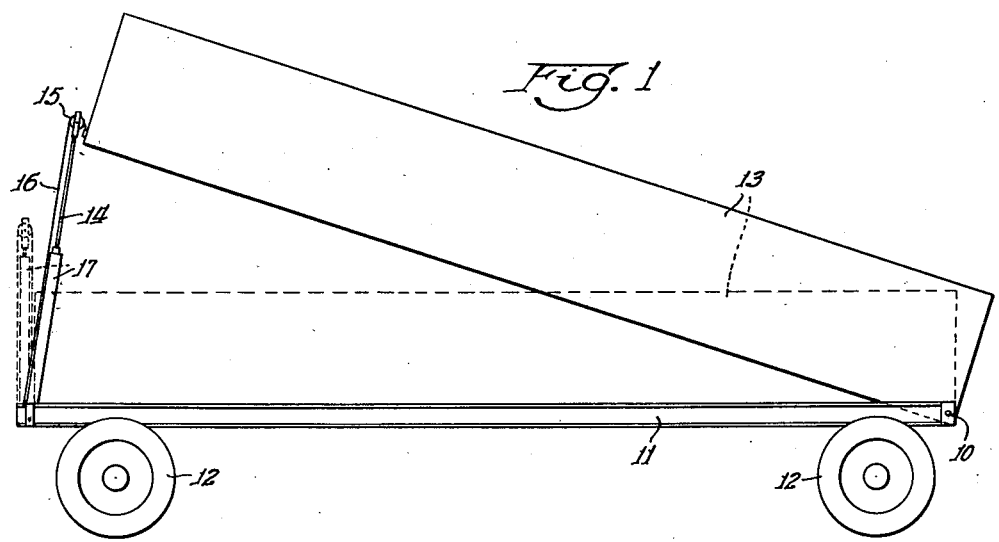
Figure 1 is a side view of a vehicle provided with the present invention where the body of the vehicle is in raised position.

Referring to Figure 1, it will be seen that a vehicle or wagon has a frame 11 mounted on suitable wheels 12. A body 13 is hingedly connected at 10 to the frame 11 adjacent the rear end thereof. In this figure the front end of the body is in raised position supported by a piston rod carrying a pulley 15 at its outer end. A rope or cable 16 passes over the pulley 15 and is connected at its ends to the frame 11 and the body 13. The piston rod 14 is connected to a piston within the cylinder 17 which is mounted rigidly upon a transverse frame member 18.

Figure 2:
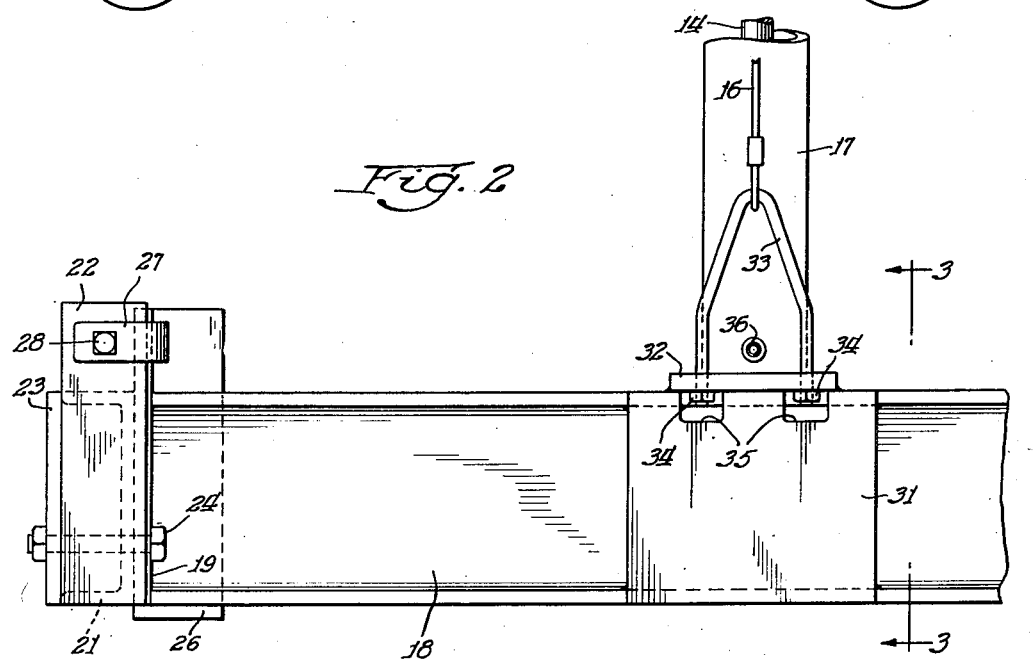
Figure 2 is a partial front view of the invention.

As may be seen from Figures 2 and 3, the transverse frame member 18 is arranged for limited pivotal movement along a longitudinal axis. Each end of the member or beam 18 has an end plate 19 which bears against the surface of the side channel members 21. The front end of each side channel member of the frame 11 carries an end plate 22 which has a portion extending above the side beam 21. On the side of the beam or channel member 21 there is mounted a plate 23. Preferably the end plates 19 and 21 and the side plate 23 are welded in position. Bolts 24 passing through the plates 19 and 23 provide the pivotal support for the transverse member or beam 18.

As may be seen from Figure 3, the back of the beam 18 carries an angle iron bar 26 which is welded into position so that the lower portion of the bar 26 provides a support shelf for the front end of the body 13 when it is in lowered position. At each end of the bar 26 there is secured a bracket 27 which carries an adjustable stop screw 28 retained in adjusted position by a lock nut 29. The adjustable stop is provided so that for different vehicles or bodies, the proper limit may be determined for the angular displacement of the cylinder 17. A limit is provided so that the cylinder 17 will not go too far when the load shifts in the body. The provision for angular displacement of the hoisting mechanism comprising the piston and cylinder greatly reduces the strain thereon compared to a cylinder fixed in position.

In order to provide a suitable support for the cylinder 17, a plate 31 is welded to the front of the I beam 18 at the central portion. Another plate 32 is welded to the top of the I beam 18, and this plate extends forwardly to support a clevis 33 which serves as an anchor for one end of the cable 16. The clevis is held in position by nuts 34 which are positioned within recesses 35 in the plate 31. A flexible conduit 36 is connected to the bottom of the cylinder to supply hydraulic power thereto from a suitable source.

It will be seen from Figure 1 that when the body 13 is raised the cylinder 13 on the transverse member 18 moves in a clockwise direction so that there is only a relatively small angle between the axis of the cylinder and the front wall of the body 13. The angular movement of the cylinder is limited by the adjustable stop screw 28 so that any movement of the vehicle during unloading of the body 13 will not cause the cylinder to move too far toward the rear. When the hydraulic pressure on the piston is relieved the weight of the body 13 will move the piston and rod 14 into the cylinder 17, until the body 13 engages the support shelf 26. The body 13 therefore latches or holds the member 18 and the cylinder 17 in substantially the position shown in Figure 3.

For certain vehicle bodies and particular loads to be carried thereby it may be desirable to provide a plurality of cables and pulleys in a manner illustrated in Figure 5. In that case, the piston rod 14 is provided with a cross bar 37 which carries at its outer extremities pulleys. A plurality of cables 39 are connected to spaced points on the body of the vehicle and to spaced points on the transverse support bar or member 18. Such an arrangement applies the lifting force to two points on the body which is advantageous for wide bodies or unbalanced loads.

While for the purpose of showing and describing the present invention, a preferred embodiment has been illustrated in the drawings, it is to be understood that the invention is not limited thereby since such variations in the instrumentalities employed and in their arrangement are contemplated as may be commensurate with the spirit and scope of the invention as set forth in the following claims.

What I claim as new and desire to secure by Letters Patent is:

1. In a vehicle, the combination comprising a frame, a body hingedly connected to said frame at the rear thereof, a hingedly mounted transverse member located adjacent the front of said frame, said member having a portion arranged to support the front end of said body, a hydraulic cylinder and piston mounted in upright position on said member, a pulley connected to said piston, a cable interconnecting said frame, said body and said pulley, and adjustable stop means for limiting the rearward pivotal movement of said cylinder and said member.

2. In a vehicle, the combination comprising a frame, a body hingedly connected to said frame adjacent the rear thereof, a transverse member pivotally mounted on said frame adjacent the front thereof, means for raising and lowering the front of said body including a hydraulic cylinder and piston rigidly mounted in an upright position on said member, cable and pulley means interconnecting said frame, said body and said piston, means carried by said member for supporting said body in lowered position and for restoring said member to a predetermined position, and adjustable stop means for predetermining the arc through which said member may be rotated rearwardly thereby to maintain the angle between said cylinder and said body relatively small.

3. The combination comprising a vehicle having a frame, a body therefor hingedly connected thereto adjacent one end, a transversely arranged beam adjacent the other end of said frame, means for pivotally supporting said beam along a longitudinal axis, a fluid operated cylinder and piston mounted vertically at the center of said beam, a pulley supported by said piston, a cable having one end fixedly secured at one end and passing over said pulley, the other end of said cable being connected to said body adjacent the bottom thereof, body supporting means mounted on said beam and being arranged to restore said beam to a certain position when said body engages said supporting means, and adjustable limit means mounted on said frame and said beam for limiting the rearward pivotal movement thereof.

4. The combination comprising a vehicle having a frame, a body therefor hingedly connected thereto adjacent one end, a transversely arranged beam adjacent the other end of said frame, means for pivotally supporting said beam along a longitudinal axis, a fluid operated cylinder and piston mounted vertically at the center of said beam, a pulley supported by said piston, a cable having one end secured to said frame and passing over said pulley, the other end of said cable being connected to said body adjacent the bottom thereof, body supporting means mounted on said beam and being arranged to restore said beam to a certain position when said body engages said supporting means, and adjustable limit means mounted on said frame and said beam for limiting the rearward pivotal movement thereof, said limit means including a vertical member mounted on said frame, and a generally horizontal member provided with an adjusting screw, said latter member being mounted on said beam.

5. The combination comprising a vehicle having a frame, a body therefor hingedly connected thereto adjacent the rear end, a transversely arranged member adjacent the front end of said frame, means for pivotally supporting said member along its longitudinal axis, a fluid operated cylinder and piston mounted vertically at the center of said member, a pulley supported by said piston, a cable having one end fixedly secured and passing over said pulley, the other end of said cable being connected to said body, body supporting means mounted on said member and being arranged to restore said member and said cylinder to a certain position when said body engages said supporting means, and adjustable limit means mounted on said frame and said member for limiting the rearward pivotal movement thereof, said limit means including a vertical member and a generally horizontal member provided with an adjusting screw, one of said members being mounted on said frame and the other of said members being mounted on said transversely arranged member of said vehicle frame.

6. In a wagon body hoist, the combination of a hoist frame having side bars, and a cross bar swiveled thereto at their front ends, said cross bar having seats upon which the front end of a wagon body rests when in its lowered position, the rear ends of said side bars having hinge bolts secured therein upon which the wagon body is hinged, a hydraulic hoist, including an extensible member, mounted on said cross bar and having a pulley rotatively mounted on the outer end of said extensible member, and a flexible connection secured at one end to the wagon body and trained over said pulley with its other end connected to the cross bar of the hoist frame.

7. In a wagon body hoist, the combination of a hoist frame having channeled side bars with hinge bolts at their rear ends, upon which is hinged a wagon body, a cross bar extending between the side bars at their front ends, and upright plates welded to the side bars on the channel sides thereof, upright plates welded to the ends of the cross bar, hinge bolts extending through said plates and the webs of the side bars, a hydraulic hoist mounted on said cross bar, a pulley rotatively mounted on the outer end of the extensible member of the hydraulic hoist, a cable secured to the wagon body and trained over the pulley with its other end connected to the cross bar, and stop screws carried by the cross bar and arranged to bear against the side bars to limit tilting movement of the hoist toward the wagon body.

RAYMOND M. ULRICH.

REFERENCES CITED

The following references are of record in the file of this patent:

UNITED STATES PATENTS

| Number | Name | Date |
|---|---|---|
| 907,150 | Kilmer | Dec. 22, 1908 |
| 1,406,131 | Wood | Feb. 7, 1922 |
| 1,552,281 | Edwards | Sept. 1, 1925 |
| 1,563,640 | McCormick | Dec. 1, 1925 |
| 1,728,460 | Weber et al. | Sept. 17, 1929 |